US012732085B2

(12) United States Patent
Xiang et al.

(10) Patent No.: US 12,732,085 B2
(45) Date of Patent: Sep. 8, 2026

(54) INVERTER, METHOD FOR CONTROLLING OPERATION MODE, AND INVERTER SYSTEM

(71) Applicant: Sungrow (Shanghai) Co., Ltd., Shanghai (CN)

(72) Inventors: Zeyu Xiang, Hefei (CN); Tinghuan Tao, Hefei (CN); Fangyu Shu, Hefei (CN); Shoubin Ni, Hefei (CN); Xinguang Huang, Hefei (CN)

(73) Assignee: Sungrow (Shanghai) Co., Ltd., Shanghai (CN)

( * ) Notice: Subject to any disclaimer, the term of this patent is extended or adjusted under 35 U.S.C. 154(b) by 153 days.

(21) Appl. No.: 18/783,779

(22) Filed: Jul. 25, 2024

(65) Prior Publication Data

US 2025/0246984 A1 Jul. 31, 2025

(30) Foreign Application Priority Data

Jan. 30, 2024 (CN) ......................... 202410130293.9

(51) Int. Cl.

*H02M 1/00* (2007.01)
*H02M 7/5387* (2007.01)
*H02J 9/06* (2006.01)

(52) U.S. Cl.

CPC ....... *H02M 1/0009* (2021.05); *H02M 7/5387* (2013.01); *H02J 9/062* (2013.01); *H02M 1/009* (2021.05)

(58) Field of Classification Search

CPC ............................... H02M 1/009; Y02E 10/56
See application file for complete search history.

(56) References Cited

U.S. PATENT DOCUMENTS

| | | | | |
|---|---|---|---|---|
| 7,177,168 | B2 * | 2/2007 | Toyomura | H01R 13/7039 363/146 |
| 8,559,201 | B2 * | 10/2013 | Fujii | H02H 7/122 363/55 |
| 10,505,370 | B2 * | 12/2019 | Geng | G01R 31/42 |
| 11,799,296 | B2 * | 10/2023 | Chen | H02J 3/381 |

* cited by examiner

*Primary Examiner* — Gary A Nash
(74) *Attorney, Agent, or Firm* — Wolf, Greenfield & Sacks, P.C.

(57) ABSTRACT

An inverter, a method for controlling an operation mode, and an inverter system are provided. The inverter includes a detection circuit and a controller. The detection circuit is configured to detect a state of an auxiliary switch in a junction box, and send the state of the auxiliary switch to the controller. The controller is configured to determine an operation mode of the inverter based on the state of the auxiliary switch. The state of the auxiliary switch is synchronized with a state of a power switch in a first switch assembly. The state of the power switch in the first switch assembly is used to indicate a state of a power grid.

10 Claims, 7 Drawing Sheets

Prior Art

INVERTER, METHOD FOR CONTROLLING OPERATION MODE, AND INVERTER SYSTEM

The present application claims priority to Chinese Patent Application No. 202410130293.9, titled "INVERTER, METHOD FOR CONTROLLING OPERATION MODE, AND INVERTER SYSTEM", filed on Jan. 30, 2024 with the China National Intellectual Property Administration, which is incorporated herein by reference in its entirety.

FIELD

The present disclosure relates to the technical field of energy storage, and in particular to an inverter, a method for controlling an operation mode, and an inverter system.

BACKGROUND

An inverter is a converter that converts direct current power to alternating current power by a high-frequency bridge circuit for supplying the power to a load connected to the inverter. At present, the inverter operates in two operation modes, namely a grid-connected mode and an off-grid mode. In the grid-connected mode, the inverter supplies power to the load by means of a current signal. Specifically, if power supplied by the inverter is insufficient, both the inverter and the power grid supply power to the load. If power supplied by the inverter is sufficient, the inverter supplies power to the load, and supplies remaining power to the power grid. In the off-grid mode, the inverter supplies power to the load by means of a voltage signal.

In a case that the power grid is in an islanded state, for example, the power grid is powered off or the power grid fails, a switch assembly, such as a relay, in the inverter, controls the inverter to operate in the off-grid mode. The switchover between the grid-connected mode and the off-grid mode described above is realized in a case of the inverter directly connected to the power grid and the load. In some application scenarios, the inverter is externally connected to a junction box, and the inverter is connected to the power grid through the junction box, in order to achieve a current of 200 A or a current more than 200 A for whole home backup, or to facilitate wiring. In such a case, if the power grid is in the islanded state, the inverter fails to be switched to the off-grid mode even if a relay in the junction box is opened.

SUMMARY

An inverter, a method for controlling an operation mode, and an inverter system are provided according to the present disclosure, to control an inverter to operate in the off-grid mode in a case that the inverter is externally connected to a junction box.

In a first aspect, an inverter is provided according to an embodiment of the present disclosure. The inverter includes a detection circuit, an inverter circuit and a controller.

An output end of the inverter circuit is connected to an alternating current power grid through a junction box, the junction box includes a first switch assembly, and the first switch assembly includes a power switch and an auxiliary switch, an on-off state of the auxiliary switch is synchronized with an on-off state of the power switch, and the power switch is configured to connect the output end of the inverter circuit to the alternating current power grid, and to disconnect the output end of the inverter circuit from the alternating current power grid. A first detection terminal of the detection circuit is connected to a first terminal of the auxiliary switch, a second detection terminal of the detection circuit is connected to a second terminal of the auxiliary switch, and an output terminal of the detection circuit is connected to the controller. The detection circuit is configured to: detect the on-off state of the auxiliary switch, and send the detected on-off state of the auxiliary switch to the controller. The controller is configured to: control the inverter to operate in an operation mode corresponding to the received on-off state, where the operation mode of the inverter refers to one of an off-grid mode and a grid-connected mode.

DETAILED DESCRIPTION OF EMBODIMENTS

An inverter is a converter which converts direct current power to alternating current power by a high-frequency bridge circuit for supplying the power to a load connected to the inverter. The inverter has many topologies.

Figure 1:
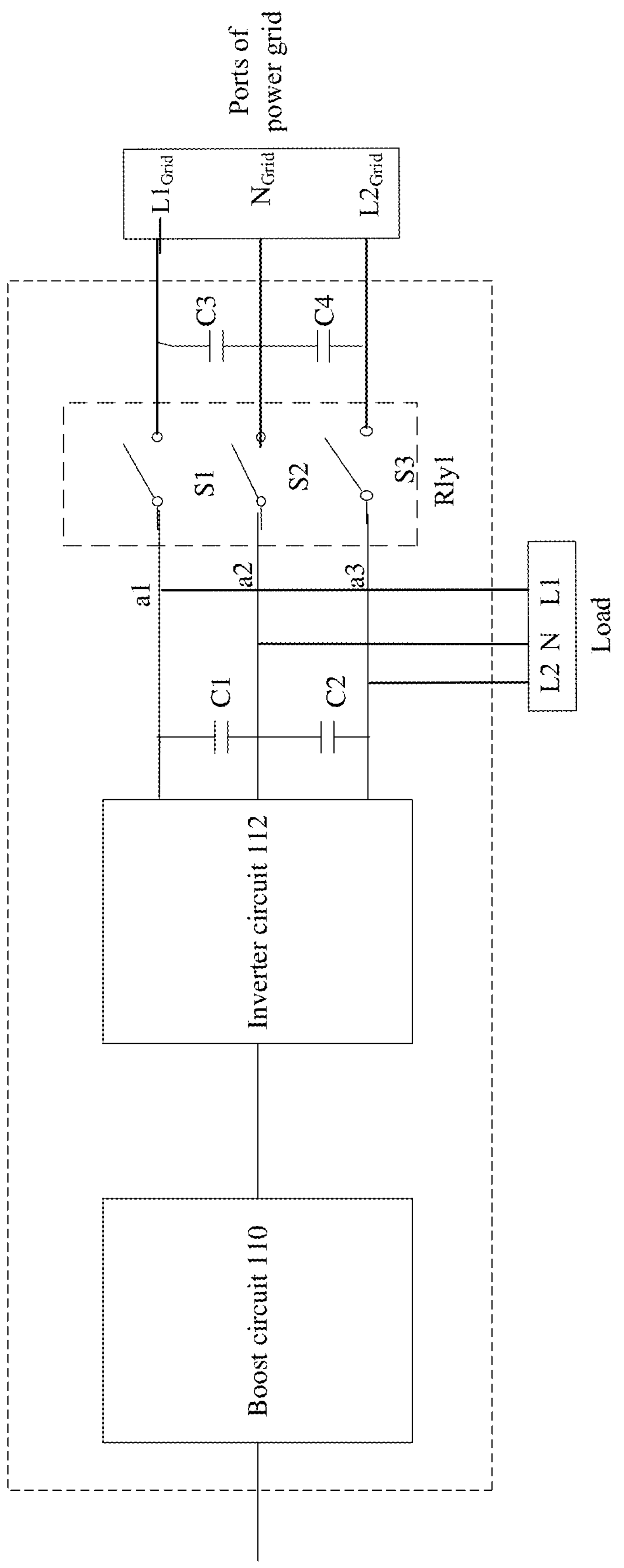
FIG. 1 is a schematic structural diagram of an inverter.

Reference to FIG. 1, which is a schematic structural diagram of an inverter. The inverter includes a boost circuit 110, an inverter circuit 112, a first capacitor C1, a second capacitor C2, a relay Rly1, a third capacitor C3, and a fourth capacitor C4.

An input end of the boost circuit 110 is connected to a photovoltaic array. The photovoltaic array is configured to directly convert solar energy into electric energy by using the photovoltaic effect of a semiconductor material of a solar cell. Direct current power generated by the photovoltaic array is inputted to the boost circuit 110 and is boosted by the boost circuit 110. The boosted direct current power is transmitted to the inverter circuit 112 and is converted to alternating current power by the inverter circuit 112. The alternating current power is supplied to a load or a power grid.

Alternatively, the input end of the boost circuit 110 is connected to a battery. Direct current power generated by the battery is inputted to the boost circuit 110 and is boosted by the boost circuit 110. The boosted direct current power is transmitted to the inverter circuit 112 and is converted to alternating current power by the inverter circuit 112. The alternating current power is supplied to a load or a power grid.

The inverter circuit 112 includes a first output terminal a1, a second output terminal a2, and a third output terminal a3. The three output terminals are connected to three ports of the power grid through the relay Rly1 respectively, and/or connected to three ports of the load. Specifically, the first output terminal a1 is connected to a port L1 of the load, and is connected to a port $L1_{Grid}$ of the power grid through a first switch S1. The second output terminal a2 is connected to a port N of the load, and is connected to a port $N_{Grid}$ of the power grid through a second switch S2. The third output terminal a3 is connected to a port L2 of the load, and is connected to a port $L2_{Grid}$ of the power grid through a third switch S3.

In addition, the first output terminal a1 is connected to a first terminal of the first capacitor C1. The second output terminal a2 is connected to a second terminal of the first capacitor C1. The third output terminal a3 is connected to a second terminal of the second capacitor C2. The second terminal of the first capacitor C1 is connected to a first terminal of the second capacitor C2. The first capacitor C1 and the second capacitor C2 are used for filtering, and filtered power is supplied to the load or the power grid.

Further, the first output terminal a1 is connected to a first terminal of the third capacitor C3 through the first switch S1. The second output terminal a2 is connected to a second terminal of the third capacitor C3 and a first terminal of the fourth capacitor C4 through the second switch S2. The third output terminal a3 is connected to a second terminal of the fourth capacitor C4 through the third switch S3. The third capacitor C3 and the fourth capacitor C4 are used for filtering and voltage stabilization. Power obtained through filtering and voltage stabilization is supplied to the power grid. Alternatively, the third capacitor C3 and the fourth capacitor C4 are used for filtering, and filtered power is supplied to the load.

The inverter may be provided with one boost circuit or multiple boost circuits.

Figure 2:
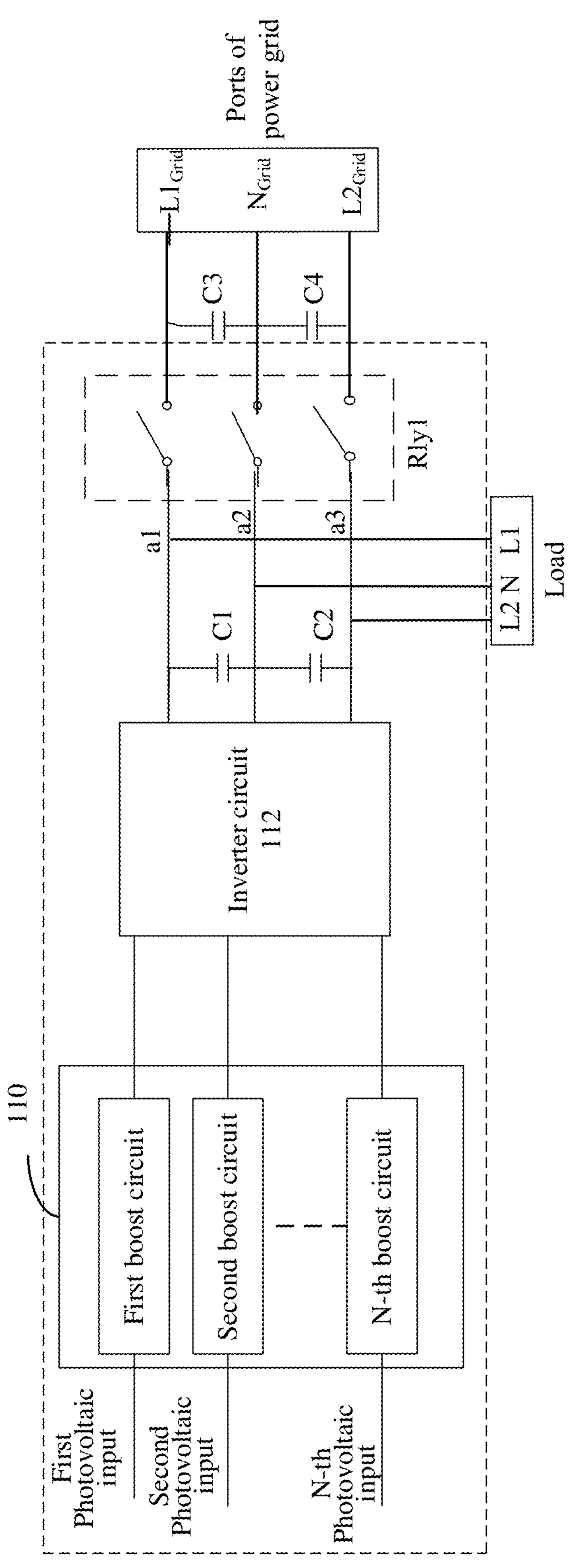
FIG. 2 is a schematic structural diagram of another inverter.

Reference is made to FIG. 2, which is a schematic structural diagram of another inverter. The inverter is provided with multiple boost circuits, namely a first boost circuit, a second boost circuit, . . . , and an N-th boost circuit, where N is an integer greater than one. An output end of each of the boost circuits is connected to the inverter circuit 112. An input end of each of the boost circuits is connected to one photovoltaic array. In this way, multiple photovoltaic arrays are connected in parallel to the same inverter through the boost circuit 110.

Figure 3:
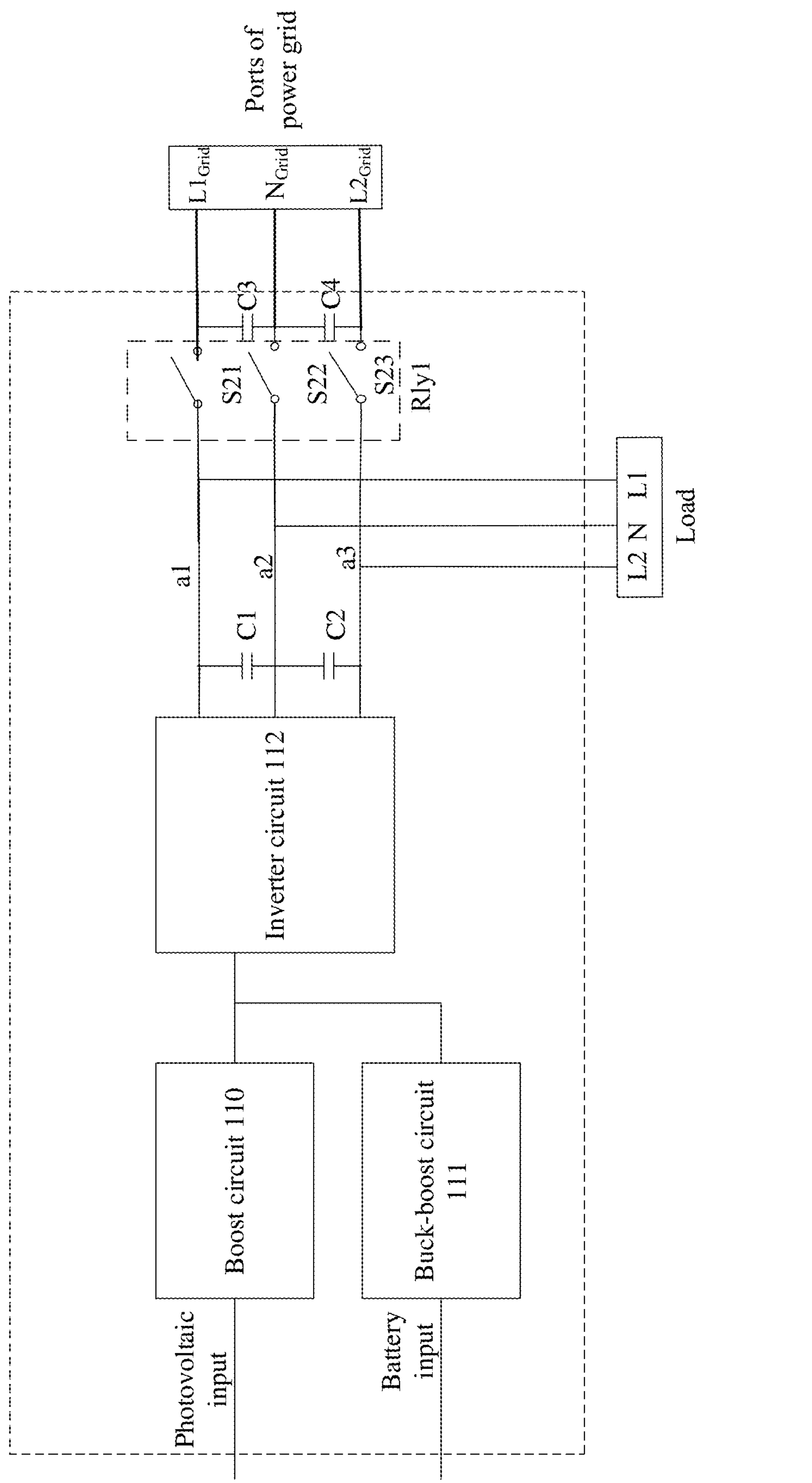
FIG. 3 is a schematic structural diagram of another inverter.

Reference is made to FIG. 3, which is a schematic structural diagram of another inverter. The inverter further includes a buck-boost circuit 111 besides the devices shown in FIG. 1.

A first terminal of the buck-boost circuit 111 is connected to a battery, and a second terminal of the buck-boost circuit 111 is connected to a first terminal of the inverter circuit 112. Direct current power from the battery is inputted into the buck-boost circuit 111 and is boosted by a boost module in the buck-boost circuit 111. The boosted direct current power is transmitted to the inverter circuit 112 and is converted to alternating current power by the inverter circuit 112. The alternating current power is supplied to the load or the power grid. Alternatively, the photovoltaic array generates direct current power, and the direct current power is boosted by the boost circuit 110. A part of the boosted direct current power is transmitted to a buck module in the buck-boost circuit 111 and is stepped down by the buck module, and step-down direct current power is stored in the battery.

The inverters shown in FIGS. 1 to 3 are merely exemplary. In practice, the inverter may have many other topologies, and the topologies are not limited herein.

At present, the inverter operates in two operation modes, namely a grid-connected mode and an off-grid mode. In the grid-connected mode, the inverter supplies power to the load by means of a current signal. Specifically, if power supplied by the inverter is insufficient, both the inverter and the power grid supply power to the load. If power supplied by the inverter is sufficient, the inverter supplies power to the load, and supplies remaining power to the power grid. In the off-grid mode, the inverter supplies power to the load by means of a voltage signal. The inverter may be switched between the two operation modes. For example, the inverter may be switched from the grid-connected mode to the off-grid mode, or from the off-grid mode to the grid-connected mode.

For example, as shown in FIG. 1, 2 or 3, in a case that the power grid operates normally, the inverter is in the grid-connected mode, and switches in the relay Rly1 are closed. In a case that the power grid operates abnormally, for example, the power grid fails, the power grid is powered off, or undervoltage occurs in the power grid, the switches in the relay Rly1 are opened, and the inverter is switched from the grid-connected mode to the off-grid mode.

Figure 4:
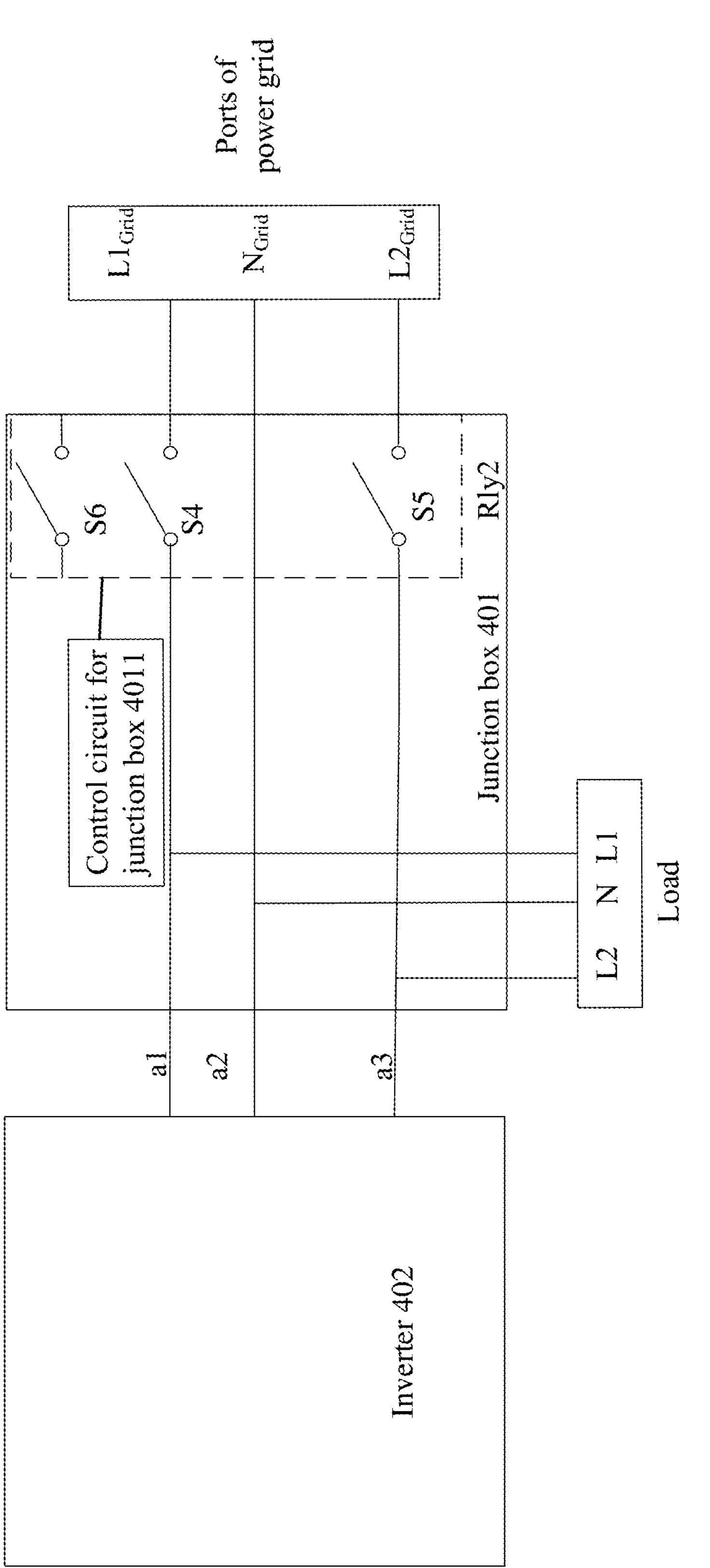
FIG. 4 is a schematic diagram illustrating that an inverter is connected to a junction box according to the related technology.

At present, in some application scenarios, the inverter is externally connected to a junction box, in order to achieve a current of 200 A or a current more than 200 A, and the junction box is used for switchover between the grid-connected mode and the off-grid mode. Reference is made to FIG. 4, which is a schematic diagram illustrating that an inverter is connected to a junction box according to the conventional technology.

As shown in FIG. 4, the inverter 402 may be any one of the inverters shown in FIGS. 1 to 3. The junction box 401 includes a relay Rly2. The relay Rly2 includes a first power switch S4, a second power switch S5 and an auxiliary switch S6. The junction box 401 further includes a control circuit 4011 for the junction box. In a case that the power grid operates abnormally, the control circuit 4011 for the junction box controls all the switches in the relay Rly2 to be opened. In a case that the power grid operates normally, the control circuit 4011 for the junction box controls all the switches in the relay Rly2 to be closed.

A first output terminal a1 of the inverter 402 is connected to the port $L1_{Grid}$ of the power grid through the first power switch S4 in the junction box 401. A second output terminal a2 of the inverter 402 is connected to the port $N_{Grid}$ of the power grid via a power line in the junction box 401. A third output terminal a3 of the inverter 402 is connected to the port $L2_{Grid}$ of the power grid through the second power switch S4 in the junction box 401.

The junction box 401 is internally provided with load connection ports for connecting the ports of the load.

The switchover between the grid-connected mode and the off-grid mode according to any one of the solutions shown in FIGS. 1 to 3 is not applicable to the inverter connected to the junction box according to the conventional technology. That is, the inverter fails to be switched to the off-grid mode even if the relay Rly1 in the inverter is opened, and the inverter fails to be switched to the grid-connected mode even if the relay Rly1 in the inverter is closed.

In view of the above problem, an inverter is provided according to an embodiment of the present disclosure. The inverter includes a detection circuit, an inverter circuit and a controller. The detection circuit is configured to detect a state of an auxiliary switch in a junction box, and sends the state of the auxiliary switch to the controller. The controller is configured to control the inverter to operate in an operation mode corresponding to the state of the auxiliary switch.

The state of the auxiliary switch is synchronized with a state of a power switch in a first switch assembly. The state of the power switch in the first switch assembly is used to indicate a state of the power grid. In this way, if the power grid fails or the power grid is powered off, that is, the power grid is in an islanded state, the power switch is opened, and the auxiliary switch is also opened. The detection circuit acquires an off state of the auxiliary switch and sends the off state to the controller. The controller controls the inverter to operate in the off-grid mode based on the off state, so that the inverter can be switched to the off-grid mode in a case of being externally connected to the junction box.

The technical solutions in the embodiments of the present disclosure are described clearly and completely in conjunction with the drawings in the embodiments of the present disclosure hereinafter. It is apparent that the described embodiments are only some rather than all embodiments of the present disclosure. All other embodiments obtained by those skilled in the art based on the embodiments of the present disclosure without any creative work fall within the protection scope of the present disclosure.

To better describe the embodiments of the present disclosure, the inverter shown in FIG. 3 is described as an example. It should be noted that, the structure of the inverter shown in FIG. 3 is merely exemplary. The structure of the inverter may be adjusted as needed by those skilled in the art, and may be a structure shown in FIG. 1 or 2 or other structure, which is not limited herein.

Figure 5:
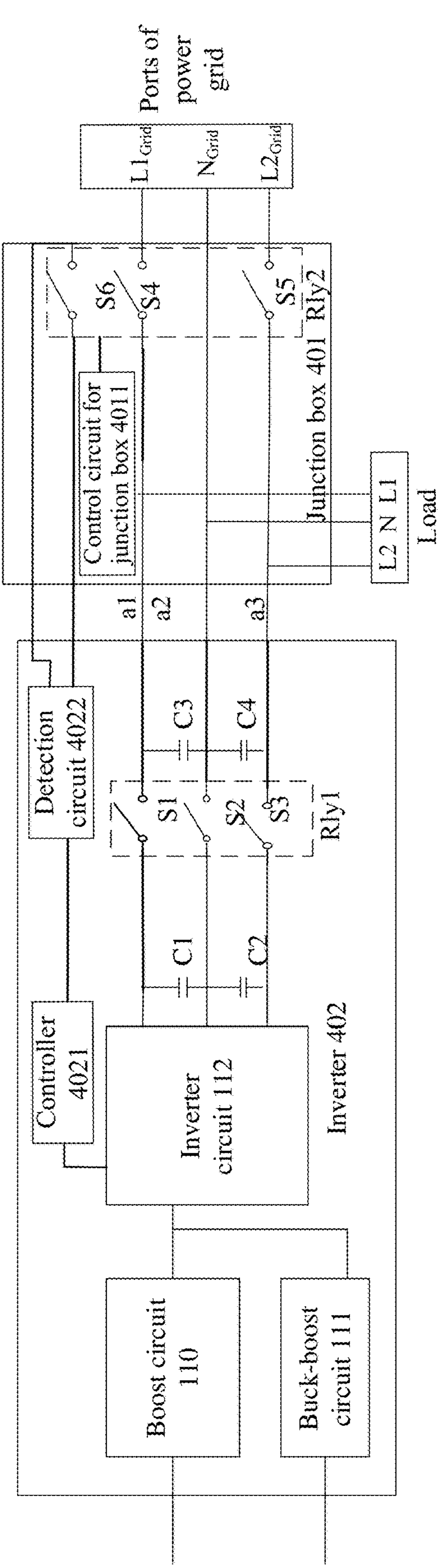
FIG. 5 is a schematic structural diagram of an inverter system according to an embodiment of the present disclosure.

Reference is made to FIG. 5, which is a schematic structural diagram of an inverter system according to an embodiment of the present disclosure. The inverter system includes a junction box 401 and an inverter 402. The inverter 402 further includes a detection circuit 4022 and a controller 4021. The junction box includes a first switch assembly and a control circuit 4011 for the junction box. The first switch assembly is also referred to as a relay Rly2.

A first terminal of the detection circuit 4022 is connected to a first terminal of the auxiliary switch S6 in the junction box 401. A second terminal of the detection circuit 4022 is connected to a second terminal of the auxiliary switch S6 in the junction box 401. A third terminal of the detection circuit is connected to the controller 4021.

An on-off state of the auxiliary switch S6 in the junction box 401 is synchronized with an on-off state of other switches in the relay Rly2. In a case that the power grid operates abnormally, the control circuit 4011 for the junction box controls a first power switch S4 and a second power switch S5 in the relay Rly2 to be opened, and the auxiliary switch S6 is opened. In a case that the power grid operates normally, the control circuit 4011 for the junction box controls the first power switch S4 and the second power switch S5 in the relay Rly2 to be closed, and the auxiliary switch S6 is closed.

The detection circuit 4022 is configured to detect an on-off state of the auxiliary switch S6, and sends the on-off state to the controller 4021. The controller 4021 is configured to control the inverter 402 to operate in an operation mode corresponding to the received on-off state. If the controller 4021 receives an off state, the inverter 402 operates in the off-grid mode. If the controller 4021 receives an on state, the inverter 402 operates in the grid-connected mode.

In the embodiment of the present disclosure, the controller 4021 is connected to an inverter circuit 112, and controls the inverter circuit 112 to operate in an operation mode corresponding to the on-off state sent by the detection circuit 4022. Specifically, the controller 4021 controls the inverter circuit 112 to operate in the off-grid mode if the auxiliary switch is in the off state, and controls the inverter circuit 112 to operate in the grid-connected mode if the auxiliary switch is in the on state.

In an embodiment, the detection circuit 4022 acquires a detection value corresponding to the on-off state of the auxiliary switch, and sends the detection value to the controller 4021. The controller 4021 determines the operation mode of the inverter based on the received detection value.

For example, if the auxiliary switch is in the off state, the detection circuit 4022 acquires a first detection value corresponding to the off state; and if the auxiliary switch is in the on state, the detection circuit 4022 acquires a second detection value corresponding to the on state. The controller 4021 determines the operation mode of the inverter as the off-grid mode in response to the first detection value, and determines the operation mode of the inverter as the grid-connected mode in response to the second detection value. In this way, the switchover between the grid-connected mode and the off-grid mode can be realized based on the on-off state of the auxiliary switch according to the embodiment of the present disclosure.

The detection circuit 4022 is not limited herein.

The detection circuit 4022 includes a regulation module. A first detection terminal of the regulation module is connected to the first terminal of the auxiliary switch, and a second detection terminal of the regulation module is connected to the second terminal of the auxiliary switch. The regulation module is configured to acquire a detection value corresponding to the on-off state of the auxiliary switch.

In an embodiment, the regulation module is a digital input (DI) circuit. In this case, the detection circuit 4022 detects the on-off state of the auxiliary switch, and generates a level value corresponding to the on-off state of the auxiliary switch. The detection circuit 4022 sends the level value to the controller 4021. The controller 4021 determines the operation mode of the inverter based on the level value.

If the auxiliary switch S6 is in the off state, the DI circuit generates a first level value. If the auxiliary switch S6 is in the on state, the DI circuit generates a second level value. The first level value is different from the second level value. The DI circuit sends the level value to the controller 4021. The controller 4021 controls, on receipt of the first level value, the inverter circuit 112 to operate in the off-grid mode, and controls, on receipt of the second level value, the inverter circuit 112 to operate in the grid-connected mode.

In another embodiment, the regulation module includes a first power supply, a first resistor, a second resistor, a converter, a second power supply and a third resistor. A first terminal of the first resistor is connected to the first terminal of the auxiliary switch S6, and a second terminal of the first resistor is connected to the first power supply. A first terminal of the second resistor is connected to a positive electrode of the converter, and a second terminal of the second resistor is connected to the first power supply. A negative electrode of the converter is connected to the first terminal of the auxiliary switch, a collector of the converter is connected to a first terminal of the third resistor, and an emitter of the converter is grounded. A second terminal of the third resistor is connected to the second power supply, and the first terminal of the third resistor is connected to the controller. The converter is implemented as different functions based on the on-off state of the auxiliary switch. For example, the converter is an optical coupler.

Figure 6:
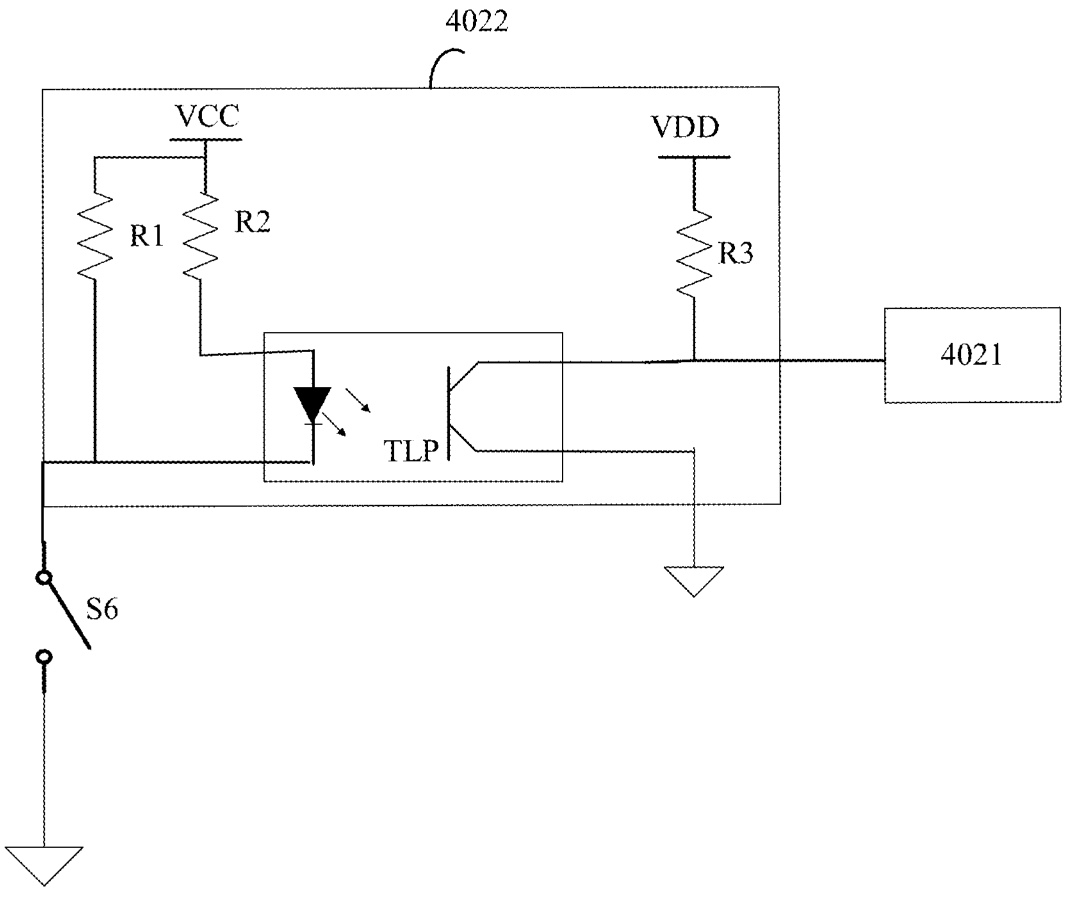
FIG. 6 is a schematic structural diagram of a detection circuit according to an embodiment of the present disclosure.

Reference is made to FIG. 6, which is a schematic structural diagram of a detection circuit according to an embodiment of the present disclosure. The regulation module of the detection circuit 4022 includes a first power supply VCC, a first resistor R1, a second resistor R2, an optical coupler TLP, a second power supply VDD and a third resistor R3. A first terminal of the first resistor R1 is connected to the first terminal of the auxiliary switch S6, and a second terminal of the first resistor R1 is connected to the first power supply VCC. A first terminal of the second resistor R2 is connected to a positive electrode of the optical coupler, and a second terminal of the second resistor R2 is connected to the first power supply VCC. A negative electrode of the optical coupler TLP is connected to the first terminal of the auxiliary switch S6, and the second terminal of the auxiliary switch S6 is grounded. A collector of the optical coupler TLP is connected to a first terminal of the third resistor, and an emitter of the optical coupler is grounded. A second terminal of the third resistor R3 is connected to the second power supply VDD, and the first terminal of the third resistor R3 is connected to the controller 4021. If the auxiliary switch S6 is opened, a voltage difference between the positive electrode and the negative electrode of the optical coupler is less than a forward voltage, and the optical coupler is not formed as a resistor. In such case, the detection circuit 4022 sends the first level value to the controller 4021, where the first level value is a low level value. If the auxiliary switch S6 is closed, a voltage difference between the positive electrode and the negative electrode of the optical coupler is greater than the forward voltage, and the optical coupler is formed as a resistor. In such case, the detection circuit 4022 sends the second level value to the controller 4021, where the second level value is approximately equal to the value of the second power supply VDD.

It should be noted that, the first power supply VCC is the same as or different from the second power supply VDD, depending on the actual requirements.

The detection circuit may be implemented by other circuit, which is not limited herein.

The inverter according to the embodiment of the present disclosure is additionally provided with the detection circuit and the controller. The detection circuit is configured to detect the state of the auxiliary switch in the junction box, and sends the state of the auxiliary switch to the controller. The controller is configured to determine the operation mode of the inverter based on the state of the auxiliary switch. The state of the auxiliary switch is synchronized with the state of the power switch in the first switch assembly. The state of the power switch in the first switch assembly is used to indicate the state of the power grid. In this way, if the power grid fails or the power grid is powered off, that is, the power grid is in an islanded state, the power switch is opened, and the auxiliary switch is also opened. The detection circuit generates a level value corresponding to the off state of the auxiliary switch. The controller controls the inverter to operate in the off-grid mode based on the level value, so that the inverter can be switched to the off-grid mode in a case of being externally connected to the junction box.

Further, the controller 4021 includes a main control circuit and a relay control circuit. The control circuit 4011 for the junction box includes a main control circuit for the junction box and a relay control circuit for the junction box. To facilitate distinguishing, in the controller 4021, the main control circuit is referred to as a first main control circuit, and the relay control circuit is referred to as a first relay control circuit. The main control circuit for the junction box is referred to as a second main control circuit, and the relay control circuit for the junction box is referred to as a second relay control circuit.

Figure 7:
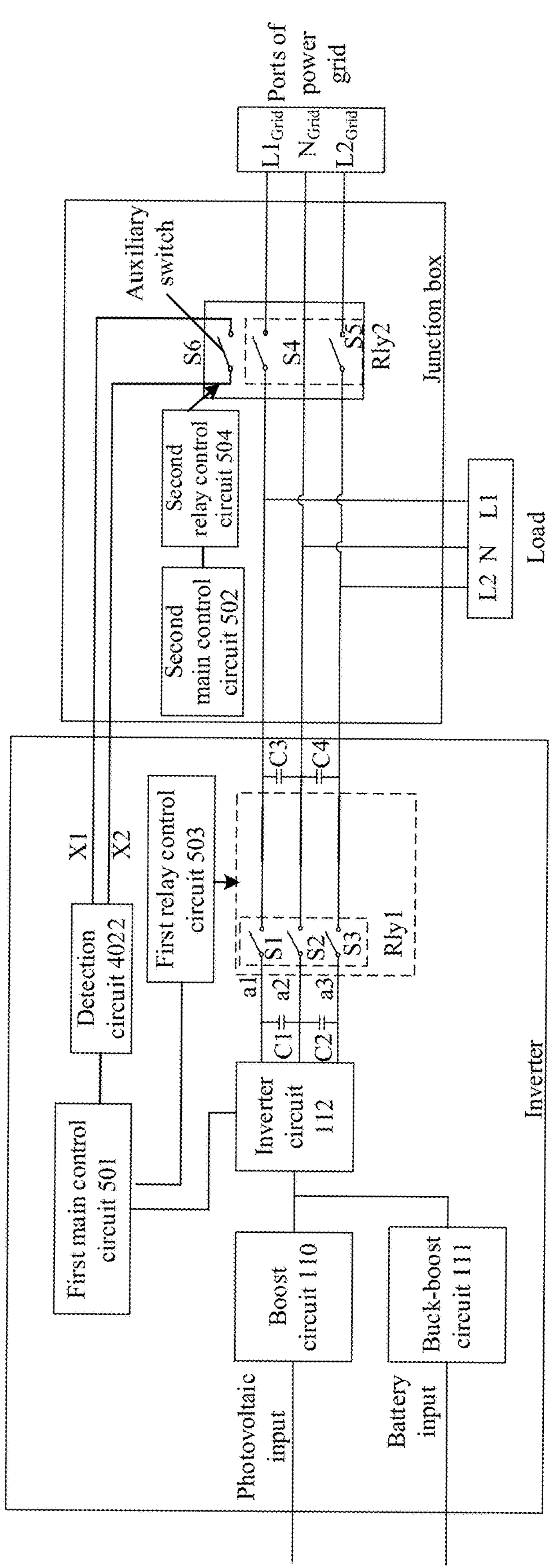
FIG. 7 is a schematic structural diagram of an inverter system according to another embodiment of the present disclosure.

Reference is made to FIG. 7, which is a schematic structural diagram of an inverter system according to another embodiment of the present disclosure.

The junction box includes a second main control circuit 502, a second relay control circuit 504 and a relay Rly2.

The relay Rly2 includes three controllable switches, namely a first power switch S4, a second power switch S5 and an auxiliary switch S6. A fixed contact of the first power switch S4 is connected to the first output terminal a1, and a moving contact of the first power switch S4 is connected to the port L1 Grid of the power grid. A fixed contact of the second power switch S5 is connected to the third output terminal a3, and a moving contact of the second power switch S5 is connected to the port $L\mathbf{2}_{Grid}$ of the power grid. A moving contact of the auxiliary switch S6 is connected to a first signal input terminal X1 of the detection circuit 4022, and a fixed contact of the auxiliary switch S6 is connected to a second signal input terminal X2 of the detection circuit 4022. The second output terminal a2 is connected to the port $N_{Grid}$ of the power grid, and is connected to a second port N of the load. The first output terminal a1 is connected to a first port L1 of the load. The third output terminal a3 is connected to a third port L2 of the load.

The inverter supplies power to the load or supplies remaining power to the power grid through the first output terminal a1, the second output terminal a2, and the third output terminal a3.

The second main control circuit 502 is connected to the second relay control circuit 504. In a case that the power grid operates abnormally, for example, undervoltage occurs in the power grid, or the power grid is islanded, the second main control circuit 502 determines that the power grid is abnormal, generates an off command, and sends the off command to the second relay control circuit 504. The second relay control circuit 504 controls, in response to the off command from the second main control circuit 502, the auxiliary switch S6, the first power switch S4, and the second power switch S5, in the relay Rly2 to be opened.

In a case that the power grid operates normally, the second main control circuit 502 determines that the power grid is normal, generates an on command, and sends the on command to the second relay control circuit 504. The second relay control circuit 504 controls, in response to the on command, the auxiliary switch S6, the first power switch S4, and the second power switch S5 to be closed.

The controller 4021 includes a first main control circuit 501 and a first relay control circuit 503. A first terminal of the first main control circuit 501 is connected to the detection circuit 4022, and a second terminal of the first main control circuit 501 is connected to the inverter circuit 112. A third terminal of the first main control circuit 501 is connected to the first relay control circuit 503. The first relay control circuit 503 is connected to a relay Rly1 and the relay Rly2, and is configured to control controllable switches in the relay Rly1 to be opened or closed.

The first output terminal a1 of the inverter circuit 112 is connected to the port L1 Grid of the power grid through a first switch S1 of the relay Rly1 via a power line. The second output terminal a2 of the inverter circuit 112 is connected to the port $N_{Grid}$ of the power grid through a second switch S2 of the relay Rly1 via a power line. The third output terminal a3 of the inverter circuit 112 is connected to the port $L\mathbf{2}_{Grid}$ of the power grid through a third switch S3 of the relay Rly1 via a power line.

The first signal input terminal X1 of the detection circuit 4022 is connected to the moving contact of the auxilary switch S6, and the second signal input terminal X2 of the detection circuit 4022 is connected to a the fixed contact of the auxiliary switch S6.

The controller 4021 acquires a state of the auxiliary switch from the detection circuit 4022. In the embodiment of the present disclosure, if the auxiliary switch is in a first state, the auxiliary switch S6 is opened, and the detection circuit 4022 generates the first level value. If the auxiliary contact is in a second state, the auxiliary switch S6 is closed, and the detection circuit 4022 generates the second level value. The first level value is greater than the second level value. That is, the detection circuit 4022 converts the state of the auxiliary contact to a level value and sends the level value to the controller 4021.

If the auxiliary switch is in the off state, the detection circuit 4022 sends the first level value to the first main control circuit 501. The first main control circuit 501 determines that the operation mode of the inverter circuit 112 is the off-grid mode based on the first level value. That is, the first main control circuit 501 controls the inverter circuit 112 to operate in the off-grid mode.

If the auxiliary switch is in the on state, the detection circuit 4022 sends the second level value to the first main control circuit 501. The first main control circuit 501 determines that the operation mode of the inverter circuit 112 is the grid-connected mode based on the second level value. That is, the first main control circuit 501 controls the inverter circuit 112 to operate in the grid-connected mode.

In an embodiment, the first main control circuit 501 generates an off command based on at least one of the first level value and the second level value and sends the on command to the first relay controller 503. The first relay controller 503 controls, in response to the on command, all the controllable switches in the relay Rly1 to be closed. The inverter operates normally and supplies power to the load.

With the method for switching between the grid-connected mode and the off-grid mode according to the embodiments of the present disclosure, the relay in the junction box is opened and closed within 12 ms for switching between the grid-connected mode and the off-grid mode, and a sum of a duration for which the state of the contact is transmitted to the inverter and a response time period of the inverter is less than 3 ms, so that the inverter can be switched between the grid-connected mode and the off-grid mode within 15 ms, achieving seamless switching between the grid-connected mode and the off-grid mode, thereby improving user experience. Moreover, only two signal lines are additionally provided, the cost is low and control is easy.

Description of the flow and structure corresponding to each of the drawings has a different focus. For parts not described in detail in a flow or structure, references may be made to the relevant descriptions of other flows or structures.

The foregoing descriptions are only some embodiments of the present disclosure, which does not limit the protection scope of the present disclosure. Any variations or replacements without departing from the technical scope disclosed in the present disclosure fall into the protection scope of the present disclosure. Therefore, the protection scope of this present disclosure should be subject to the protection scope defined by the claims.

The invention claimed is:

1. An inverter, comprising:

a detection circuit, an inverter circuit and a controller, wherein an output end of the inverter circuit is connected to an alternating current power grid through a junction box, the junction box comprises a first switch assembly, and the first switch assembly comprises a power switch and an auxiliary switch, an on-off state of the auxiliary switch is synchronized with an on-off state of the power switch, and the power switch is configured to connect the output end of the inverter circuit to the alternating current power grid, and to disconnect the output end of the inverter circuit from the alternating current power grid;

a first detection terminal of the detection circuit is connected to a first terminal of the auxiliary switch, a second detection terminal of the detection circuit is connected to a second terminal of the auxiliary switch, and an output terminal of the detection circuit is connected to the controller;

the detection circuit is configured to detect the on-off state of the auxiliary switch, and send the detected on-off state of the auxiliary switch to the controller; and the controller is configured to control the inverter to operate in an operation mode corresponding to the received on-off state, wherein the operation mode of the inverter refers to one of an off-grid mode and a grid-connected mode.

2. The inverter according to claim 1, wherein the detection circuit is configured to acquire a detection value corresponding to the on-off state of the auxiliary switch, and send the detection value to the controller; and the controller is configured to determine the operation mode of the inverter based on the received detection value.

3. The inverter according to claim 2, wherein for acquiring the detection value corresponding to the on-off state of the auxiliary switch, the detection circuit is further configured to:

acquire a first detection value corresponding to the off state in response to the auxiliary switch being in an off state; and acquire a second detection value corresponding to the on state in response to the auxiliary switch being in an on state, wherein for determining the operation mode of the inverter based on the received detection value, the controller is further configured to:

determine the operation mode of the inverter as the off-grid mode in response to the first detection value; and determine the operation mode of the inverter as the grid-connected mode in response to the second detection value.

4. The inverter according to claim 2, wherein the detection circuit comprises a regulation module, wherein a first detection terminal of the regulation module is connected to the first terminal of the auxiliary switch, a second detection terminal of the regulation module is connected to the second terminal of the auxiliary switch, and an output terminal of the regulation module is connected to the controller; and the regulation module is configured to: acquire the detection value corresponding to the on-off state of the auxiliary switch.

5. The inverter according to claim 4, wherein the regulation module comprises a resistance regulator, wherein a first detection terminal of the resistance regulator is grounded, a second detection terminal of the resistance regulator is connected to a power supply, and an output terminal of the resistance regulator is connected to the controller; and the resistance regulator is configured to: acquire a resistance value corresponding to the on-off state of the auxiliary switch, and acquire the detection value corresponding to the on-off state of the auxiliary switch based on the resistance value.

6. The inverter according to claim 4, wherein the regulation module comprises a first power supply, a first resistor, a second resistor, a converter, a second power supply and a third resistor, wherein a first terminal of the first resistor is connected to the first terminal of the auxiliary switch, and a second terminal of the first resistor is connected to the first power supply;

a first terminal of the second resistor is connected to a positive electrode of the converter, and a second terminal of the second resistor is connected to the first power supply;

a negative electrode of the converter is connected to the first terminal of the auxiliary switch, a collector of the converter is connected to a first terminal of the third resistor, and an emitter of the converter is grounded; and a second terminal of the third resistor is connected to the second power supply, and the first terminal of the third resistor is connected to the controller.

7. The inverter according to claim 1, wherein the controller comprises a main controller and a relay controller, wherein an input terminal of the main controller is connected to the detection circuit, an output terminal of the main controller is connected to an input terminal of the relay controller, and an output terminal of the relay controller is connected to the output end of the inverter;

the main controller is configured to: receive the on-off state of the auxiliary switch sent by the detection circuit, and determine a state of a relay in the inverter as an on state based on the on-off state of the auxiliary switch; and the main controller is further configured to: send an on signal corresponding to the on state of the relay in the inverter to the relay controller; and the relay controller is configured to: control the relay in the inverter to be closed in response to the on signal sent by the main controller.

8. An inverter system, comprising the inverter according to claim 1 and a junction box.

9. A method for controlling an operation mode of an inverter, wherein the inverter comprises a detection circuit and a controller, wherein a first terminal of the detection circuit is connected to a first terminal of an auxiliary switch, a second terminal of the detection circuit is connected to a second terminal of the auxiliary switch, and a third terminal of the detection circuit is connected to the controller; a first switch assembly in a junction box comprises the auxiliary switch and a power switch, and an on-off state of the auxiliary switch is synchronized with an on-off state of the power switch;

and the power switch is connected to a power grid, and is configured to detect a state of the power grid, wherein the method comprises:

detecting, by the detection circuit, the on-off state of the auxiliary switch, and sending, by the detection circuit, the detected on-off state of the auxiliary switch to the controller, wherein the on-off state of the auxiliary switch is used to indicate the state of the power grid, and the power grid is connected to the inverter; and determining, by the controller, an operation mode of the inverter based on a state of the first switch assembly, wherein the operation mode of the inverter comprises an off-grid mode and a grid-connected mode.

10. The method according to claim 9, wherein the detecting, by the detection circuit, of the on-off state of the auxiliary switch, and the sending, by the detection circuit, of the detected on-off state of the auxiliary switch to the controller comprises:

acquiring a detection value corresponding to the on-off state of the auxiliary switch, and sending the detection value to the controller, wherein the inverter is controlled to operate in the operation mode corresponding to the received on-off state by:

determining the operation mode of the inverter based on the received detection value, and controlling the inverter to operate in the operation mode corresponding to the received on-off state.

* * * * *